B. D. GRAY & R. F. RUNGE.
METHOD OF FORMING GROOVES IN BEARING RINGS, &c.
APPLICATION FILED FEB. 2, 1917.

1,269,808.

Patented June 18, 1918.

UNITED STATES PATENT OFFICE.

BUDD D. GRAY AND ROBERT F. RUNGE, OF PHILADELPHIA, PENNSYLVANIA, ASSIGNORS TO THE HESS-BRIGHT MANUFACTURING COMPANY, A CORPORATION OF DELAWARE.

METHOD OF FORMING GROOVES IN BEARING-RINGS, &c.

1,269,808.

Specification of Letters Patent.  Patented June 18, 1918.

Application filed February 2, 1917. Serial No. 146,077.

*To all whom it may concern:*

Be it known that we, BUDD D. GRAY and ROBERT F. RUNGE, citizens of the United States, residing at Philadelphia, in the county of Philadelphia and State of Pennsylvania, have invented certain new and useful Improvements in Methods of Forming Grooves in Bearing-Rings, &c., of which the following is a specification, reference being had therein to the accompanying drawing.

This invention relates to the formation of grooves in metal stock, and has reference more particularly to the formation of grooves in the casing rings of antifriction bearings, to serve as race-ways for the antifriction balls which travel between the rings.

Such antifriction bearings comprise inner and outer concentric rings, the raceways for the balls being formed conjointly by a groove in the inner side of the outer ring and a corresponding groove in the outer side of the inner ring, it being necessary that the metal of the rings be very hard to resist wear and that the grooved surfaces be given a smooth and accurate finish. Ordinarily these grooves are formed at a depth in each ring approximately one-eighth of the ball diameter, but in certain classes of bearings for certain work, the grooves are deeper and extend to approximately one-fourth of the ball diameter, the deeper groove being of advantage in that it leaves a greater thickness of metal in a radial direction at the sides of the groove, which increased thickness gives greater rigidity, stiffness and sustaining qualities to the rings.

In forming the grooves in the rings as heretofore practised, the rings in a comparatively soft condition are acted on by a suitable tool which forms the groove to substantially its full depth; then the ring is hardened, and finally the face of the groove is subjected to a finishing operation which cuts away and smooths down the surface, and gives it its final accurate form and finish. The finishing tool, due to the extreme hardness of the material, meets with considerable resistance, and the finishing operation is consequently more or less prolonged and expensive. Inasmuch as a deep groove presents a greater surface to be finished, it follows that the formation of such groove involves more expense and labor on account of the additional time required for the finishing operation. In the case of a shallow groove, however, where the surface acted on is less in extent, the expense and time and labor consumed in the finishing operation is correspondingly reduced.

Our invention aims to form in the rings a groove of the greater depth, but with the same facility and at substantially no greater expense, time or labor than in the formation of the shallow groove, and the invention consists of an improved method of procedure in which the ring in its comparatively soft condition is first acted on by a tool or tools which will form in the ring a groove of the general contour of the finished groove but with the marginal or side edges of the same cut away. The ring is then subjected to a hardening operation to give the same great hardness; and finally the intermediate portion of the groove between the cut away portions is acted on by a finishing tool or grinder to smooth the same down and give it an accurate and finished surface. By this method of procedure, although the groove is of the greater depth, the finishing operation is confined to a limited area, and consequently the operation may be performed at substantially no greater labor, time or expense than in the formation of a shallow groove, yet there will be left at the sides of the groove a greater amount of material than in the case of a shallow groove, with correspondingly greater stiffness, rigidity and sustaining qualities to the ring.

The sides of the groove may be cut away in various ways, and the cut away portions may assume different forms, and in the accompanying drawings we have shown rings with such cut away portions of different form and character.

Figure 1:
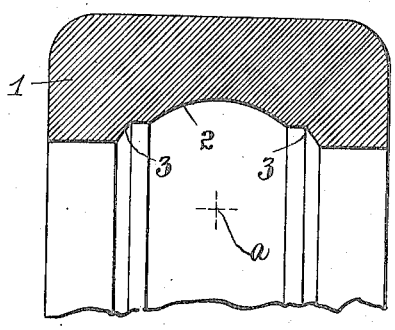
Figure 1 is a sectional elevation of an outer casing ring of an antifriction bearing in its soft condition, showing the same after the first grooving operation, and with the sides of the groove cut away.
Figure 2:
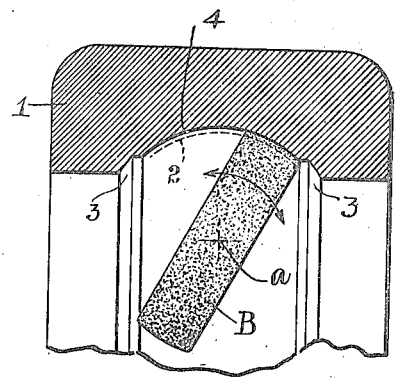
Fig. 2 is a similar view showing the ring after it has been hardened and showing by dotted lines the result of the finishing operation.

Referring to the drawings:

Referring particularly to Figs. 1 and 2, in carrying our improved method into effect, we provide in the case of the outer casing member of the bearing, a metal ring 1 in comparatively soft condition, and by means of a suitable tool we form therein a groove 2 of the general form and contour of the final groove desired and of nearly the full depth required, this groove being on a radius struck from the center $a$. The tool to produce this groove may be of such form that in the formation of the groove it will at the same time recess the ring at the marginal edges of the groove so as to form cut away portions 3. Or these recesses may be formed by means of a separate tool by a separate and additional operation. We next subject the ring thus grooved and recessed to a hardening operation, so as to give the metal great hardness and wearing qualities. The ring in its hardened condition is now operated on by a suitable finishing tool, preferably a grinding wheel, which acts on the intermediate surface or face 2 of the groove between the two recesses or cut away portions 3, and by proper manipulation of the tool this surface is further cut away as indicated beyond the dotted lines in Fig. 2 and is given a smooth and accurate finish 4 suitable to serve as a track or way for the antifriction balls of the bearing. On comparing Figs. 1 and 2 it will be observed that while the groove is of the full depth, the finishing operation is confined to the central limited portion only of the groove, and consequently the finishing operation may be performed at less time and expense than if the side edges of the groove were left intact and the entire surface of the groove including the intact portions were subjected to the finishing operation. We are enabled therefore by our method to form a deep groove in the ring at substantially no greater expense and at the expenditure of substantially no greater time or trouble than in the formation of a shallow groove, while at the same time the finished ring will possess at the sides of the deep groove, an increased radial depth of metal, which will impart rigidity, stiffness and sustaining qualities to the ring.

Figure 3:
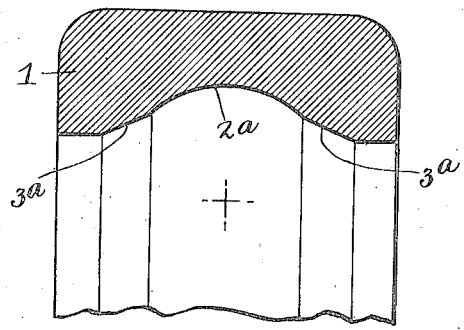
Figs. 3 and 4 are views similar to Fig. 1 but showing the side edges of the groove differently cut away.

In Fig. 3 the sides of the groove are cut away or chamfered on the straight lines $3^a$ leaving the intermediate central portion $2^a$, which is subjected to the finishing operation similar to the treatment of the portion of the groove 2 in Fig. 2.

Figure 4:
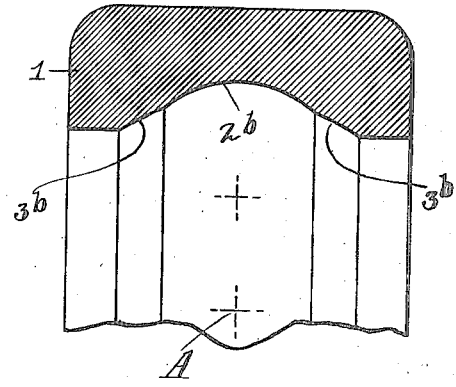

In Fig. 4 the cut away portions $3^b$ at the sides of the groove are curved on a radius struck from a center A which is located inward of the center of the radius of the central portion $2^b$ of the groove.

In all of these forms, the groove is recessed or cut away at its sides so as to leave a central limited portion to be subjected to the finishing operation.

The finishing operation may be performed by appropriate means well known to those skilled in this art, but we prefer to employ for this purpose a rotary grinding wheel B as shown in Fig. 2, the peripheral active face of which is curved to correspond with the radius of the central portion of the groove to be finished, and in relation to which wheel the ring is oscillated back and forth in a direction axially of the ring so that the wheel will in effect traverse the said surface, while at the same time the ring is rotated about its axis to bring every portion of the surface of the groove to the action of the grinding wheel, or the grinding wheel may be oscillated with reference to the ring as indicated in Fig. 2.

While we have specifically illustrated and described our improved method as applied to the formation of the groove in the inner side of the outer ring of the bearing, it will be understood that the invention is applicable as well in forming the groove in the outer side of the inner ring of the bearing, the essential feature of the invention being in cutting away the sides of the groove when the metal is in a comparatively soft, untempered condition so as to leave a restricted central area, hardening the metal and subjecting this restricted area to a finishing operation.

Having thus described our invention, what we claim is:

1. The method of forming grooves in metal stock, which consists in providing stock in comparatively soft condition, forming a groove therein with its sides cut away, hardening the metal, and subjecting the surface of the groove between the cut away portions to a finishing operation to produce a smooth accurate surface.

2. The method of forming grooves in bearing rings, which consists in providing a ring in comparatively soft condition, forming therein a groove of the general contour of the finished groove but with its side edges cut away, hardening the ring thus formed, and finally subjecting the intermediate surface of the groove between the cut away portions to a finishing operation to produce a smooth accurate surface.

3. The method of forming grooves in bearing rings, which consists in providing a ring in comparatively soft condition, forming therein a groove of the general contour of the finished groove, cutting away the sides of said groove and leaving the central portion thereof intact, hardening the ring thus formed, and finally subjecting said central portion to a finishing operation to produce a smooth accurate surface.

In testimony whereof, we have affixed our signatures.

BUDD D. GRAY.
ROBERT F. RUNGE.